US010282944B2

(12) United States Patent
Rader et al.

(10) Patent No.: US 10,282,944 B2
(45) Date of Patent: May 7, 2019

(54) MARKETING BONUS SYSTEM AND METHOD

(71) Applicant: Umpqua Indian Development Corporation, Roseburg, OR (US)

(72) Inventors: Richard Michael Rader, Roseburg, OR (US); Shawn R McDaniel, Roseburg, OR (US)

(73) Assignee: Umpqua Indian Development Corporation, Roseburg, OR (US)

( * ) Notice: Subject to any disclaimer, the term of this patent is extended or adjusted under 35 U.S.C. 154(b) by 377 days.

(21) Appl. No.: 15/216,904

(22) Filed: Jul. 22, 2016

(65) Prior Publication Data

US 2018/0025580 A1 Jan. 25, 2018

(51) Int. Cl.

*G06F 17/00* (2019.01)
*G07F 17/32* (2006.01)

(52) U.S. Cl.

CPC ........ *G07F 17/3246* (2013.01); *G07F 17/323* (2013.01); *G07F 17/3209* (2013.01); *G07F 17/3211* (2013.01); *G07F 17/3255* (2013.01)

(58) Field of Classification Search

None
See application file for complete search history.

(56) References Cited

U.S. PATENT DOCUMENTS

| | | | | |
|---|---|---|---|---|
| 6,206,782 | B1 | 3/2001 | Walker et al. | |
| 6,328,248 | B1 | 12/2001 | Kaipf | |
| 6,375,569 | B1 | 4/2002 | Acres | |
| 6,626,758 | B1 | 9/2003 | Parham et al. | |
| 6,786,824 | B2 | 9/2004 | Cannon | |
| 6,984,174 | B2 | 1/2006 | Cannon et al. | |
| 2005/0130732 | A1 * | 6/2005 | Rothschild | G07F 17/32 463/20 |
| 2005/0215314 | A1 * | 9/2005 | Schneider | G07F 17/32 463/26 |
| 2005/0215316 | A1 | 9/2005 | Rowe et al. | |
| 2006/0160620 | A1 | 7/2006 | Matthews et al. | |
| 2012/0172130 | A1 | 7/2012 | Acres | |

* cited by examiner

*Primary Examiner* — Paula A D'Agostino

(74) *Attorney, Agent, or Firm* — Fincham Downs LLC; Magdalena M. Fincham, Esq.

(57) ABSTRACT

A marketing bonus system and method for use in one or more casino establishments for awarding a prize to a player who is a member of a loyalty program and has a player card in active use at an eligible electronic gaming machine. The marketing bonus system and method randomly selects a player for an award. It may be configured to offer multiple bonuses across the floor of a casino or other gaming establishment at any given time. Players are notified prior to a bonus being awarded so that they may insert their card into an electronic gaming machine on the casino floor in the area where the bonus is active and be eligible to win. Awards are offered to eligible players at electronic gaming machines such as slot machines and video poker machines, but may also be offered on other types of devices that are in active use such as general purpose computing devices connected to the system over a network such as the internet.

21 Claims, 9 Drawing Sheets

400

| | Configuration Screen | |
|---|---|---|
| Line 1 | Bonus Name | $25 Max Winner Amount |
| Line 2 | Bonus Award Amount Minimum | $1.00 |
| Line 3 | Bonus Award Amount Maximum | $25.00 |
| Line 4 | Bonus Status | Active |
| Line 5 | Device Enrollment | 10001,10002,10003 |
| Line 6 | Device Enrollment Type | Location Codes |
| Line 7 | Device Enrollment Description | Use Location Codes for Enrolled Devices |
| Line 8 | Pre-Notification Minimum Time | 20 |
| Line 9 | Pre-Notification Maximum Time | 100 |
| Line 10 | Notification Minimum Time | 2 |
| Line 11 | Notification Maximum Time | 4 |
| Line 12 | Bonus Trigger Name | Every 20 Minutes Minimum |
| Line 13 | Bonus Trigger Period Minimum | 20 |
| Line 14 | Bonus Minimum Time | 01/01/2016 |
| Line 15 | Bonus Maximum Time | 01/01/2020 |

FIG. 4

500

| | Enrollment Screen | |
|---|---|---|
| Line 1 | Bonus Name | $25 Max Winner Amount |
| Line 2 | Enrollment Denom | * |
| Line 3 | Enrollment Location | * |
| Line 4 | Enrollment Manufacturer | * |
| Line 5 | Enrollment PAR | * |
| Line 6 | Enrollment GameType | Slot |
| Line 7 | Enrollment DisplayType | Video |
| Line 8 | Enrollment Leased Machine | No |
| Line 9 | Enrollment Description | * |
| Line 10 | Enrollment Asset ID | * |

FIG. 5

600

| | | Activate Screen | |
|---|---|---|---|
| Line 1 | | Bonus Name | $25 Max Winner Amount |
| Line 2 | | Monday Start Time | 00:00.0 |
| Line 3 | | Tuesday Start Time | 00:00.0 |
| Line 4 | | Wednesday Start Time | 00:00.0 |
| Line 5 | | Thursday Start Time | 00:00.0 |
| Line 6 | | Friday Start Time | 00:00.0 |
| Line 7 | | Saturday Start Time | 00:00.0 |
| Line 8 | | Sunday Start Time | 00:00.0 |
| Line 9 | | Monday End Time | 23:59.59 |
| Line 10 | | Tuesday End Time | 23:59.59 |
| Line 11 | | Wednesday End Time | 23:59.59 |
| Line 12 | | Thursday End Time | 23:59.59 |
| Line 13 | | Friday End Time | 23:59.59 |
| Line 14 | | Saturday End Time | 23:59.59 |
| Line 15 | | Sunday End Time | 23:59.59 |

FIG. 6

700

| | Bonus Monitor Screen | |
|---|---|---|
| Line 1 | Bonus Name | $25 Max Winner Amount |
| Line 2 | Current Bonus ID | XXXX |
| Line 3 | Prenotification Time | 07/01/2016 05:56 |
| Line 4 | Award Time | 07/01/2016 06:00 |
| Line 5 | Min Distinct Cards | 5 |
| Line 6 | Device Enrollment | <view_machine Mnum="14305" PAI="11433" Denom="0.0100" MtrDenom="0.0100" MFR="IGT" Description="MULTI GAME-MD 5-17" Par="10.480" GameType="POKER" DisplayType="VIDEO" MachineTypeId="1402" UniqueId="4025821" SectionName="01" Bank="15" Location="02" Maxcoins="80" Validator="Y" Status="A" CabinetType="UPRIGHT" Model="GAME KING" BankController="2_33 " Jpx="1" Ptrack="Y" PayMethod="B" PayLines="1" ReelStops="0" InitialFill="0" FillAmount="0.0000" MaxJP="10000.0000" Serialnum="1305566" Eprom="M0001055" PurchaseDate="2003-12-29T00:00:00" StartDate="2014-12-03T00:00:00" CabinetNumber="14305 " BagsPerFill="0" CurrentBagsInAuxFill="0" MaxBagsInAuxFill="0" HopperLevelAdjustment="0" ManualMeters="N" AmountPerBag="60000.0000" CoininCount="500" PointCount="3" MachineLocation="011502" SealNumber="0" FirstCoinPercent="5.17" MaxCoinPercent="5.17" PTType="PO" HoldPercent="10.48" TicketPrinter="Y" LeasedMachine="N" CoinInPercent="0.00" NetWinPercent="0.00" ActualAmount="0.0000" TicketParser="0" Protocol="SAS" AuxFillPrintLoc="0" HasTicketMeters="Y" GL_Code="0" HopperVarianceLimit="0" MtrMoney="0.0100" TicketsIncDropMtr="Y" TicketType="2" WATInIncDropMtr="N" MDMG="N" Coinless="Y" SBG="N" LargestLeaseAmount="N" WATEnabled="0" EGMEnabled="1" EGMID="IGT_0004025821" VoucherDataExists="Y" BillsNotInTotalDrop="N" /> |
| Line 7 | Current Floor View | <BonusPAT Location="062803 " PlayerID="350183" CardInTime="2016-06-14T05:55:12.380" CardID="40432165004715826856" LockID="40118636" FirstName="RONALD" LastName="RUSHFORD JR" description="AH - Silver" /> |
| Line 8 | Winner PlayerID | TBD |
| Line 9 | Winner Name | TBD |
| Line 10 | Winner Location | TBD |
| Line 11 | Winner Amount | $25.00 |
| Line 12 | Winner Award Date Time | TBD |
| Line 13 | Bonus Status | Active |
| Line 14 | Last Update to Record | 07/01/2016 04:45 |
| Line 15 | Bonus Maximum Time | 01/01/2020 |

FIG. 7

MARKETING BONUS SYSTEM AND METHOD

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Electronic gaming machines ("EGMs") offer a variety of games such as slot games, video poker games, roulette games, keno games and other types of wagering games that are commonly deployed at a casino for use by players. A typical prior art EGM is shown in FIG. 1. Play on the EGMs typically requires the player to place a wager on the outcome of a primary game with the possibility of winning an award based on a paytable for the particular game. On many such EGMs, secondary games or bonus rounds are also available after the player qualifies by attaining a certain winning combination at the end of the game or event, or based on other requirements related to the primary game. If the player meets the requirements, upon completion of the base game, the player enters the secondary game or bonus round where they have an opportunity to win extra game credits, game tokens or other awards. For example, the player might automatically enter the secondary game or bonus round upon achieving a winning game outcome, or alternatively, when a bonus symbol appears in a predetermined position on the reels of a slot game (or the game display of another type of game) upon completion of the game. The player may be awarded credits for winning the base game and then additional credits for winning the secondary game.

In addition to bonus games offering players opportunities to win awards, other wager dependent awards such as progressive prizes may also be available to a player. Progressive prize opportunities are well known in the art and are typically available if an additional wager is placed before the start of the game for the player to be eligible for the progressive prize. Progressive systems offer a prize value that "progresses" or grows with the play of each game, with a portion of the amount wagered for each game being contributed to the progressive prize across multiple EGMs connected to the progressive system until the prize is won. Progressive systems such as IGT's Megabucks® and Wheel of Fortune® progressives have been in operation for many years in Nevada and other legal gaming jurisdictions around the world.

In addition, it is known to configure progressive prizes for random wins either during or after a game where a player is not required to place an additional wager to be eligible for a progressive prize. Such a system is disclosed in U.S. Pat. No. 6,626,758 to Gaming Enhancements, Inc.

It is common for EGMs in a casino establishment to be connected to a player tracking system so that the casino can keep track of the amount of play by each individual player. Each player joining a "frequent player" or loyalty program is issued a player tracking device such as a card that is inserted into a card slot 105 on EGM 100 for the duration of play. The card identifies the player to the system and all wagered amounts are tracked for loyalty rewards and other marketing programs of the casino. Slot accounting systems connecting EGMs 100 are used for accounting purposes so that a casino operator can monitor and track play, and assess performance of EGMs across the entire casino floor.

Historically, the format of game play where a winning combination on a base game entitles a player to a secondary or bonus round as well as placing an additional wager for the opportunity to win a progressive award have worked well for players and gaming establishments. They generate player excitement and maintain the interest of the player. Bonusing systems for winning prizes are constantly evolving, and gaming operators and players alike are always eager to try new and innovative games and systems that offer the opportunity to award prizes.

The present invention is a marketing bonusing system and method that is configured across a network of EGMs. The system operates in parallel with other systems including player tracking, progressive bonusing systems, server based gaming systems, EGM accounting and/or other systems that deliver game content or relate to game play and data recordal/management. Unlike progressive systems or other bonusing systems related to game play, the present invention provides an opportunity for a player to be eligible for an award or prize based on a player's active participation in gaming activities at an EGM confirmed through the use of a player tracking or other identification card. In this way, a player who is a member of the establishment's loyalty program is eligible for special marketing rewards and is provided with special opportunities to receive rewards not available to the general population of players.

As is typical for a player seeking to be entertained in a gaming establishment, the player locates an EGM hosting a game that he has decided to play. Once stationed in front of the EGM, the player, who is a member of the loyalty program for the gaming establishment (or another special group) also inserts his player card into a slot on the EGM so that all game play is tracked and eligible for marketing rewards, special offers, etc. The player then loads credits on the EGM for play by inserting bills in a bill validator, or through loading credits using a card of one form or another. The player then begins play by placing a wager and hitting the "play" button. A random number generator on the EGM generates an outcome and that outcome is displayed on the EGM display to the player. In the event the outcome is a winning combination, the player is awarded a prize in accordance with the EGM pay table. If a bonus game is available and the player has met the requirements for bonus play, the player is given one or more additional opportunities to win a prize. Throughout the game play cycle and as long as the player has his player tracking or loyalty program card present in the receiving slot on the EGM, the player may be eligible for additional marketing awards that are not dependent on game play, coin-in or other game related activities on the EGM.

In one embodiment of the invention, players playing EGMs in the system are notified during a predetermined "advance period" that a random selection of a player to win an additional marketing award will be made.

BRIEF DESCRIPTION OF THE DRAWINGS

For a better understanding of the present invention, and to more clearly describe functionality, reference will now be made, by way of example, to the accompanying drawings. The drawings show embodiments of the present invention in which:

FIG. 4 is a sample configuration screen available to an operator of the marketing bonus system to set up bonusing events on the electronic marketing bonus system;

FIG. 5 is a sample enrollment screen available to an operator for setting criteria for eligibility for a particular electronic gaming machine to be eligible to win;

FIG. 6 is a sample activate screen available to an operator for setting time criteria for particular bonuses on a marketing bonus system;

FIG. 7 is a bonus monitor screen available to an operator for monitoring the status of bonuses on a marketing bonus system;

DETAILED DESCRIPTION OF THE INVENTION

Figure 1:
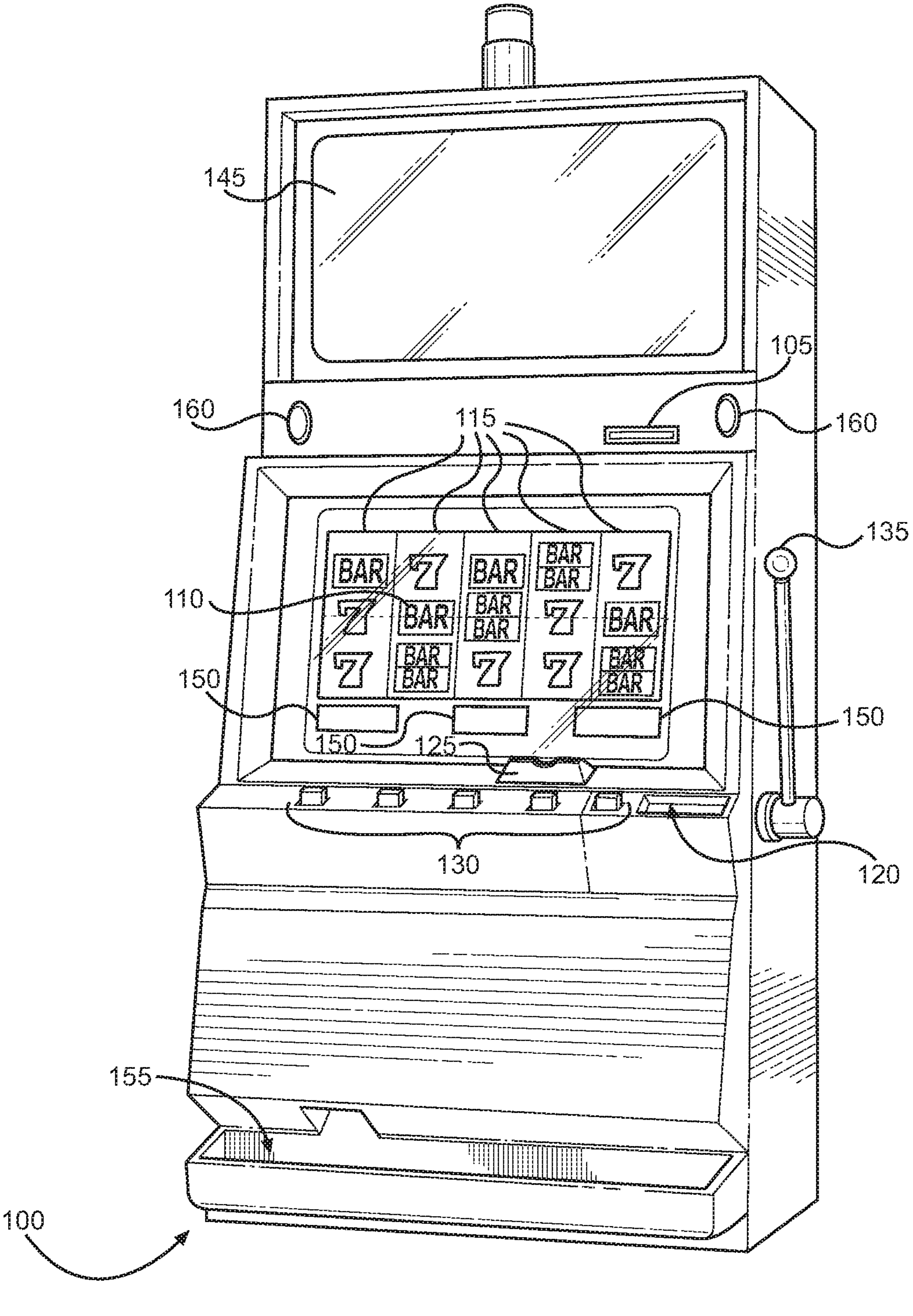
FIG. 1 PRIOR ART
FIG. 1 is a prior art electronic gaming machine of the type for use in a marketing bonus system and method.

The present invention will now be described more fully with reference to the accompanying drawings. It should be understood that the invention may be embodied in many different forms and should not be construed as limited to the embodiments set forth herein. Throughout FIGS. 1-9, like elements of the invention are referred to by the same reference numerals for consistency purposes.

FIG. 1 is a prior art electronic gaming machine ("EGM") 100 with a number of components that is used with the marketing bonus system of the present invention. A primary display 110 is used to show game play and resulting outcomes, and may be in the form of a video display (shown), or alternatively, physical reels. Touch screen displays are included on most EGMs and provide a flexible interface for operation of EGM 100, including displaying symbols during game play. Other components include a bill validator (see FIG. 2) housed inside EGM 100 into which bills may be inserted through bill slot 120. Buttons 130 on the exterior of EGM 100 are used to initiate and control EGM operations in conjunction with touch screen display 110 by the player. EGMs may further include a secondary display 145 for displaying other game functions including bonus screens. Either of primary display 110 or secondary display 145 may be used to show information to the player such as game play activity, pay tables, messages, advertising, entertainment screens or other types of content and/or information. Multiple meters 150 on display 110 are used for tracking credits available for play, amount won on a particular play, number of coins bet and other amounts are typically positioned near the bottom of screen 110.

EGM 100 may also accept coins at coin head 125. In those cases, a coin tray 155 at the bottom of EGM 100 is used to catch coins as they are dispensed to a player. An optional handle 135 for starting game play may also be included to simulate a historical mechanical handle of an EGM. Speakers 160 produce sound to accompany game play and other functions on EGM 100.

Figure 2:
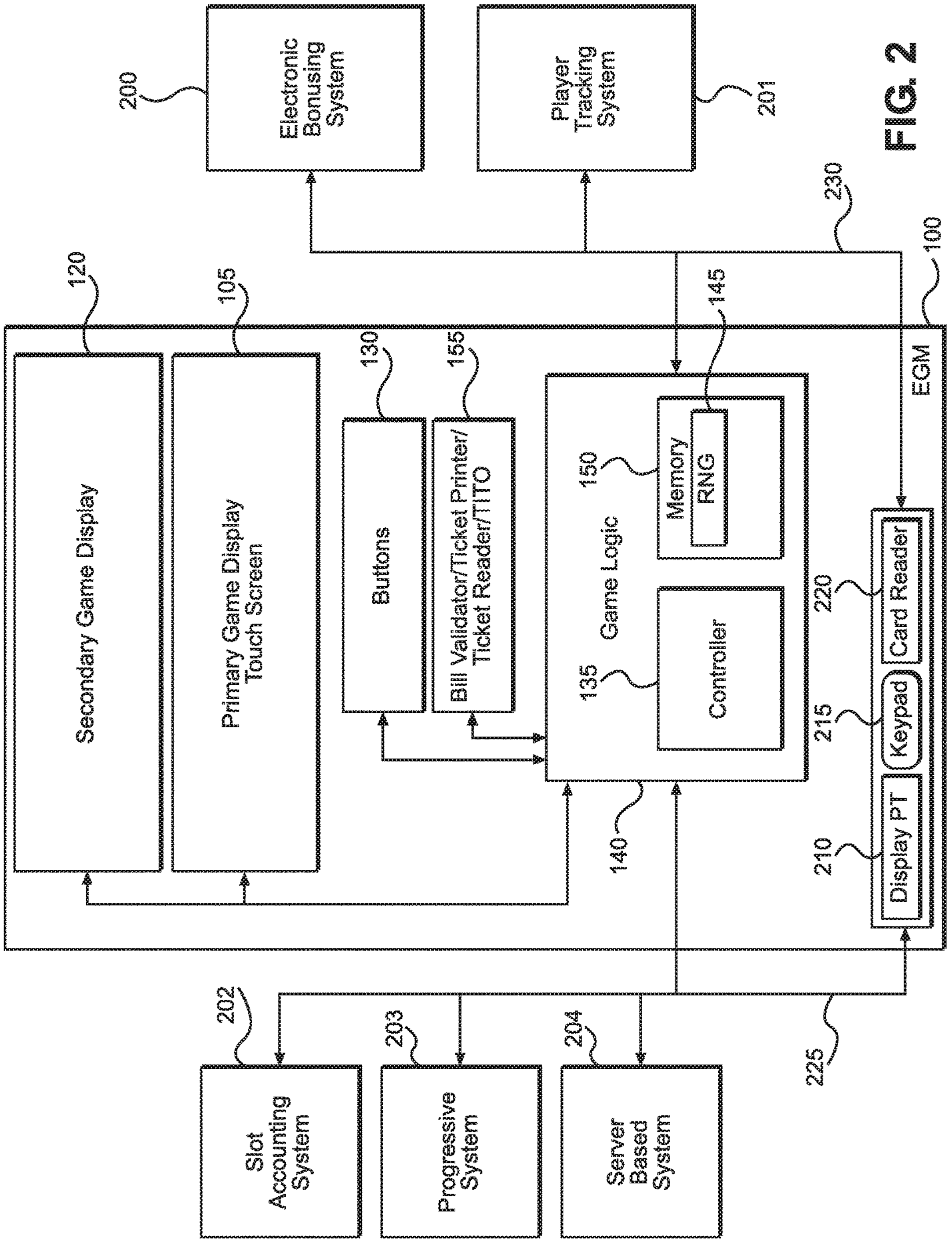
FIG. 2 is a block diagram of an electronic gaming machine for playing a game and configured to be connected to external systems over a network including an external marketing bonus system.

FIG. 2 is a block diagram of EGM 100 connected to a group of external systems including a marketing system that is an electronic bonusing system ("EBS") 200. For purposes of this description, the terms "bonusing system," "electronic bonusing system" and "marketing system" are used interchangeably herein to refer to EBS 200. Other external systems connected to EGM 100 include a player tracking system 201, a slot accounting system 202, a progressive system 203 and a server based system 204. A number of internal components of EGM 100 are also shown. All operational functions of EGM 100 are controlled by a controller 135 such as a microprocessor housed inside EGM 100 that is resident in game logic 140. Controller 135 executes instructions that include operation of an EGM based random number generator 145 ("RNG") that is typically implemented in software and stored in a memory 150. The internal components of EGM 100 are well known to those of ordinary skill in the art. Game outcomes are determined either based on the random numbers selected by local RNG 145. Alternatively, a central system (not shown) may generate game outcomes for a group of EGMs and deliver game outcomes to a group of EGMs connected over a network.

It should be understood that software or firmware may be in the form of a computer program that is a sequence of executable instructions provided in one or more computer readable medium or other storage medium. Examples of computer medium include but are not limited to electronic, magnetic, optical, electromagnetic, infrared, RFID, wireless, bluetooth or semiconductor devices that may be random access memory (RAM), read only memory (ROM), erasable programmable read only memory (EPROM or flash memory), compact disc read only memory (CD-ROM), optical storage, magnetic storage or any combination of the above. The terms "memory," "readable medium" and "storage medium" are used interchangeably and refer to any device or component that stores a program for use in a processor controlled device or system and that is in communication with the processor.

A bill validator 155 for accepting paper currency is shown. It is common for EGM 100 to include ticket-in, ticket-out ("TITO") functionality that requires bill validator 155 to perform ticket reading and ticket printing as well as for communication with a central system such as server based system 204 for ticket tracking. For purposes of this description, the terms "bill validator," "bill acceptor," currency validator," "currency acceptor" and "TITO device" will all be used interchangeably. TITO device 155 integrates validation, ticket reading and ticket printing such that it may accept paper bills or coded credits printed on a ticket through slot 120 and for which the value of the credits is displayed on meters 150 upon a ticket being inserted in EGM 100.

The different external systems 200-204 are typically connected to EGM 100 either through a separate interface board (not shown) or directly to different components of EGM 100 including but not limited to game logic board 140. Player tracking system 201, as well as the other systems may require that other components be installed in EGM 100 such as a player tracking display 210, a keypad 215 and a card reader 220. These components allow for direct interaction between EGM 100 and player tracking system 201, as well as the other external systems so that the player may input information on keypad 215 or through use of a card inserted into card reader 220 and display information to the player on display 210. One or more networks 225, 230 are configured between EBS 200, player tracking system 201, other external systems 202-204 and EGM 100. The network may be connected to all EGMs 100 in a casino or any smaller subset of EGMs 100.

Server based system 204 is shown connected to EGMs 100 on network connection 225 which may be a separate connection or the same connection as the network connecting EGM 100 to the other external systems. Server based system 200 may be a single server or it may represent a group of interconnected servers that are configured to be a single system interfacing with a group of EGMs. Server based system 200 may be used to handle various functions including but not limited to downloading game content to EGMs 100, upgrading software on EGM 100, managing TITO ticket tracking and generating and providing random numbers to EGM 100 that are used by EGM 100 as well as other EGMs connected on network 225 for determining game outcomes.

It will be understood that the type of network 225, 230 over which data is communicated among EGM 100 and the external systems can be one of several different types of networks that may be wired or wireless. These include a Local Area Network (LAN), Wide Area Network (WAN), an intranet, the internet or other classes of networks. Any type of network technology could be used without departing from the principles of the invention. This would include communication via any protocol on any of the layers of the OSI model (ISO/IEC 7498-1) with or without encryption (e.g. SSL encryption, VPN, etc). The time is synchronized on all components of the system via a network protocol such as, for example, network time protocol ("NTP") to ensure that time stamps may be reliably compared.

Figure 3:
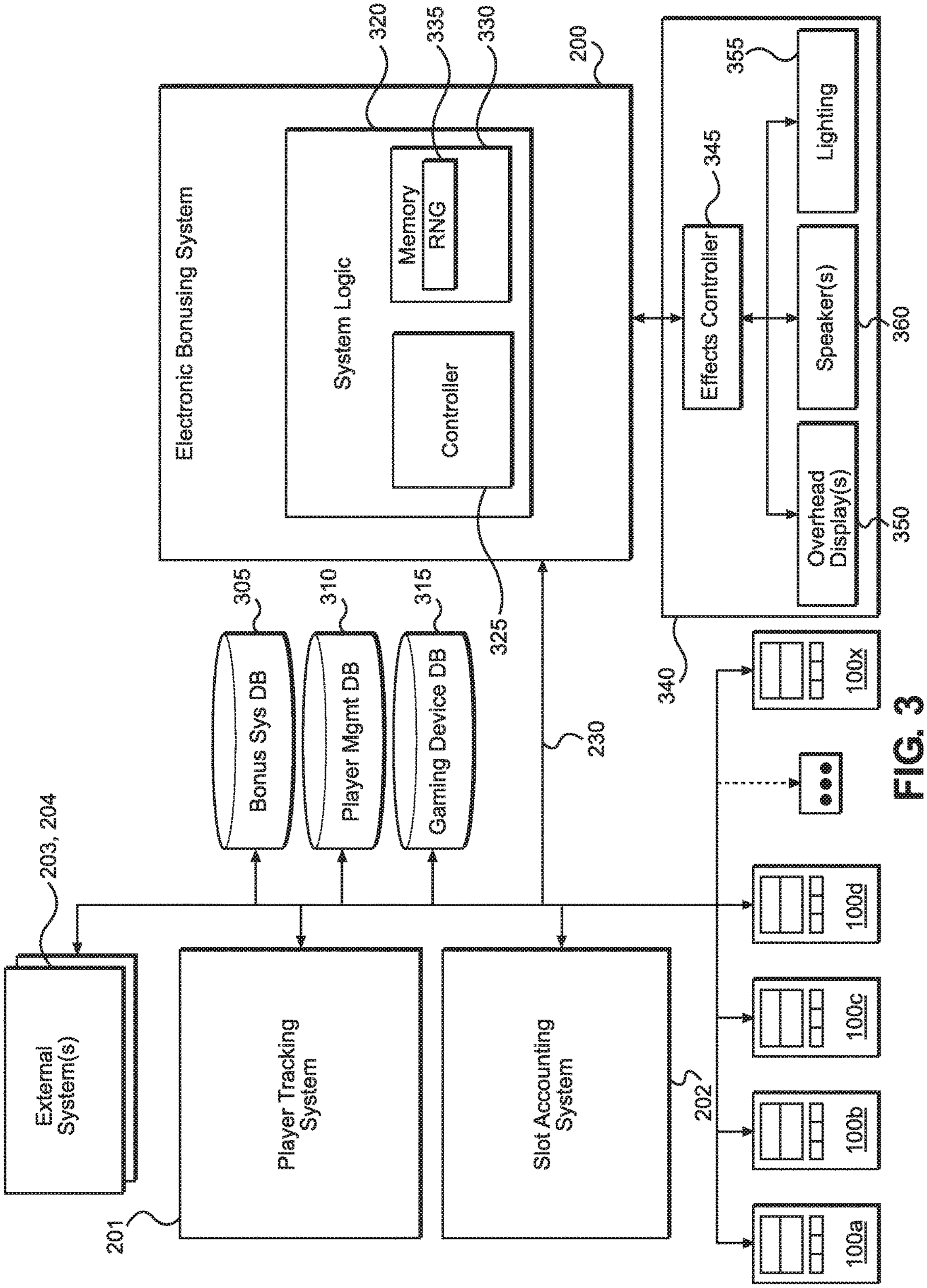
FIG. 3 is a block diagram of the marketing bonus system configured in a network with electronic gaming machines, a player tracking system, a slot accounting system, other external systems and associated databases.

FIG. 3 is a block diagram of EBS 200. EBS 200 is configured in network 230 with EGMs 100*a-x*. EBS 200 allows the award of marketing dollars to a patron account without delaying or suspending play on an EGM 100 and without the need to directly interact with the electronic components of EGM 100. This allows the gaming device to continue to function as normal without interruption during a marketing bonusing event on EBS 200.

Other systems on network 230 include player tracking system 201, slot accounting system 202 and other external systems 203, 204. A set of databases is also connected to network 230. A bonus system database 305 is primarily associated with EBS 200 and tracks different types of loyalty awards that are available to be won by players who are eligible for a loyalty award. A player management database 310 is primarily associated with player tracking system ("PTS") 201 and tracks players who are members of the establishment's loyalty program. Upon signing up to be a loyalty program member, the player provides identification information that is entered into player management database 310, such as name, date-of-birth, physical address, email address, phone number and other information that may be of interest to the establishment for marketing purposes.

A gaming device database 315 is primarily associated with slot accounting system 202. Database 315 tracks and manages information related to the EGMs 100*a-x* that are connected on network 230 such as type of machine, manufacturer, currency deposited, payouts made, game activity including games played, wagers placed, win, profitability and other measures typically managed and tracked by PTS 202.

It should be understood that the network may be set up with any number of EGMs that may number into the thousands of machines. Each of EGMs 100*a-x* may also be connected to external systems 203, 204.

EBS 200 is controlled by system logic 320 on a logic board that includes a controller 325 that is typically in the form of a microprocessor that accesses software applications held in memory 330 for operating EBS 200. Memory 330 may be static or dynamic. In memory 330 is a software random number generator ("RNG") 335 that generates and selects random numbers for the purpose of randomly awarding prizes to players on EGMs 100*a-x*.

EBS 200 may further include an integrated or external effects system 340 for delivering different bonus themes that use an effects controller 345 to control visual effects on displays 350 and lighting system 355. Visual and lighting effects may further be accompanied by audio played over speaker system 360. Displays 350 are preferably separate from and external to EGM 100. They may be very large screens that are visible to patrons while playing an EGM as well as other individuals in the establishment. In one embodiment, displays 350 are multiple, large projection units that form a "living" backdrop on the walls behind EGMs 100 a-x. In the event a prize is awarded by EBS 200, notification and sequences of themed visual images or a video feed may be shown on display(s) 350, and enhanced with orchestrated lighting effects using lighting system 355 that is configured throughout the establishment where EGMs 100*a-x* are located. In addition, notifications and other instructions may be shown on display(s) 350 as well as on the displays of individual EGMs 100*a-x*. Sounds such as celebratory music or other audio tracks corresponding to the themes coincide with the bonusing event, including leading up to, during and after the time that a prize is awarded. Instructions for receiving a reward may also be provided on speaker(s) 360. Themes may, for example, be a thunderstorm with lightning and rain, a Hawaiian theme or any other theme that can be imagined by the system designer.

In one embodiment of the invention, EGM displays 105, 120, effects system display(s) 350, lighting 355 and speakers 360 are used individually or in combination to provide a pre-notification to individuals present in the establishment informing them that a prize will be awarded at a particular point in time (e.g. "at 9:00 pm—30 minutes from now") or during a predetermined time interval (e.g. "sometime between 9:00-9:30 pm—a 30 minute interval starting 30 minutes from now"). In either case, such pre-notifications raise the level of excitement for players and entice members of the loyalty program to initiate play at an EGM where such play session may be detected using card reader 220 associated with player tracking system 201. All or a designated subset of loyalty award players who are engaged in play at the particular point in time when the prize is awarded are eligible to win the prize. Notification of a win may be reported to the winning loyalty program member on a display 105, 120 on a particular EGM and/or on overhead display(s) 350, lighting 355 and speaker(s) 360.

Eligibility of loyalty program members for a prize may be established for any player actively engaged at an EGM 100 in the establishment at the time a prize is selected and awarded. EBS 200 is able to determine eligibility by accessing gaming device database 315 in real-time over network 230 to access data set by player tracking system indicating that a player tracking card for a particular loyalty program member is inserted in card reader 220.

It is also possible to implement other requirements for a win to narrow the group of eligible loyalty program members for a particular prize. Eligibility requirements may be configured at any time for any particular prize and include, but not be limited to the following examples. In one embodiment, eligibility is limited to any loyalty member who is actively playing an EGM 100 at the time the prize is awarded. It is possible to further narrow eligibility in the case of active play to also require that a loyalty program member have wagered a minimum amount within a time period preceding the award of a prize (e.g. $25 during a 30-minute period preceding the prize) or played some number of games (e.g. 20 games). This type of EGM specific information is accessed by EBS 200 on gaming device database 315 which is constantly updated and tracked in real-time by slot accounting system 202. In cases where a minimum play threshold is an eligibility requirement, pre-notification becomes a key feature of EBS 200 operation because it is desirable to encourage players to meet the requirements in order to win the impending prize. If there is no pre-notification in advance of an award, the marketing bonus system is less effective, because while an eligible player may still be awarded for play, nobody will know that a prize is coming and there will be no incentive to get more loyalty members playing EGMs to meet the eligibility requirements.

Other eligibility requirements or factors may also be imposed for different prizes tracked in EBS database 305. Examples include establishing a minimum threshold for: (a) player rank based on play over a period of time; (b) player date of birth; (c) player historical play level; (d) player affinity group membership (e.g. over 60); (e) location of actively played EGM; (f) wager denomination by player; (g) manufacturer of EGM; (h) unique identifier of EGM (e.g. machine type); (i) game type installed on EGM; (j) type of EGM (e.g. video poker, video slot, physical reel slot, etc.); (k) level of play on EGM; (l) level of win on EGM; and/or (m) player address. Such eligibility requirements of factors may be preset by the operator of the establishment and are subject to change at the discretion of the operator. It should be understood that individual prizes are determined by the operator and may vary from site to site, time of day, profile of players visiting the establishment or any number of other single or combination of factors that are viewed as positively impacting marketing decisions for the prizes.

In the example of player date of birth, a prize may only be made available to individual program members whose birthday is within a pre-defined number of days from the present day (e.g. 5 days before or 5 days after). This information is accessible from player management database 315 by EBS 200. Another example includes player state or zip code. A "local" prize may be awarded to someone who lives in one or more zip codes surrounding the establishment or anyone visiting from a particular state, which would be known from the loyalty members' addresses maintained in player management database 315. If the establishment operator knows that a group is visiting from a particular town, county, state, region or country (domestic or foreign), awarding of prizes can be tailored to such groups.

By using different types of data related to players that is tracked and managed in player management database 310 and different types of data related to gaming operations for EGMs that is tracked and managed in gaming device database 315, the loyalty program can be leveraged to generate an increased level of excitement for players, resulting in more play for the establishment and more wins for the players.

Other requirement parameters may also be included for prize eligibility. For example, in order for a prize to be awarded, a minimum number of loyalty members must be actively playing EGMs. In that case, a player count may be displayed on overhead displays 350. If the number of active players is below the minimum threshold, it will encourage more players to initiate play, and it would also incentivize active players to encourage their friends to play so that the threshold is met and the prize is awarded. This type of activity creates a community interest for those playing in the establishment as all players are eager to see the prize awarded and for increased opportunities for someone in the collective group to win.

Prizes awarded by EBS 200 may be determined according to a number of different criteria. For example, the amount of the award may be in a predetermined range and then the particular value can be selected using an RNG. Alternatively, the prize may steadily increase during a pre-selected time period according to a set formula. Or, the prize may be a non-cash award that is in the form of merchandise or a service. An example of a configuration screen 400 for setting up a bonus is shown in FIG. 4. As can be seen in the configuration screen, the bonus is given a name, in this case "$25 Max Winner Award" (line 1). A minimum amount (e.g. $1.00—line 2) and a maximum amount (e.g. $25.00—line 3) are assigned to the award and the status is shown as "Active" (line 4). In the example, there are three different EGMs on the floor of the casino that are enrolled to win the prize and are numbered 10001, 10002 and 10003 (line 5). A "Device Enrollment Type" (line 6) and a "Device Enrollment Description" (line 7) indicate the way in which a particular machine is eligible. In the example the enrollment description refers to the location of the machines which are identified by a device number. However, other types of identifiers may be used such as a particular EGM manufacturer or EGM type (e.g. slot, poker, keno, etc.).

A pre-notification minimum (20 minutes—line 8) and maximum (100 minutes—line 9) as well as notification minimum (2 minutes—line 10) and maximum (4 minutes—line 11), are set to define the different times for the next event. An RNG is used to select the actual pre-notification time for running a special attract mode of sights and sounds for alerting players of the upcoming bonus, where the time is between the boundaries as defined for both the pre-notification. Notification time is the range of times within which a bonus is awarded once the pre-notification period expires. The notification time is also selected at random by an RNG.

A bonus trigger name (Every 20 Minutes Minimum—line 12) and period minimum (20 minutes—line 13) define the minimum period between a win of the previous bonus and the amount of time until the next bonus event begins. The time range bounded by bonus minimum time (01/01/2016—line 14) and bonus maximum time (01/01/2020—line 15) are also defined by the operator to set an ongoing bonusing event to automatically occur.

FIG. 5 is an example of an enrollment screen 500 that allows the operator to set up particular machines or machine types for eligibility for bonus awards. One or more of the different enrollment criteria listed can be selected. For example, a bonus named "$25 Max Winner Account" (line 1) is set and the criteria for eligibility in this case are that a machine be a slot type EGM (line 6) with a video display (line 7) and that it not be leased (line 8). Other criteria may also be used such as denomination ("Denom"—line 2), Location (line 3), EGM Manufacturer (line 4), PAR (line 5), description (line 9) and asset ID (line 10).

FIG. 6 is an example of an activate screen 600 available to an operator for setting time criteria for particular bonuses. The activate screen names the bonus (line 1) and then lists start and end times for each day of the week (lines 2-15). In this example, the bonuses are active 24 hours a day from midnight (00:00:00 am) each day until (11:59:59 pm) that same day. It should be understood that the time ranges for each day may be changed to set bonus activity for any given day of the week.

FIG. 7 is a bonus monitor screen 700 available to an operator for monitoring the status of bonuses in real-time. In the screenshot of FIG. 7, the bonus monitor shows the bonus "$25 Max Winner Amount" (line 1) on Jul. 1, 2016. The prenotification time (line 3) is 05:56 and the award time (line 4) is set four minutes later at 06:00. In this case, a winner has already been established and a full set of information is provided in the device enrollment block (line 6) including Machine Number (14305), Denomination (0.0100), EGM manufacturer (IGT), EGM Description (Multi-Game-MD 5-17), Par (10.480), Game Type (Poker), Display Type (Video), etc.

The current floor view (line 7) includes the bonus location, the playerID, the time the identification card was inserted, the name and other information. Other information is also shown including current bonus ID (line 2), minimum distinct cards (line 5), winner playerID (line 8), winner name (line 9), winner location (line 10), winner amount (line 11), winner award date/time (line 12), bonus status (line 13), last update to record (line 14) and bonus maximum time (line 15).

Figure 8:
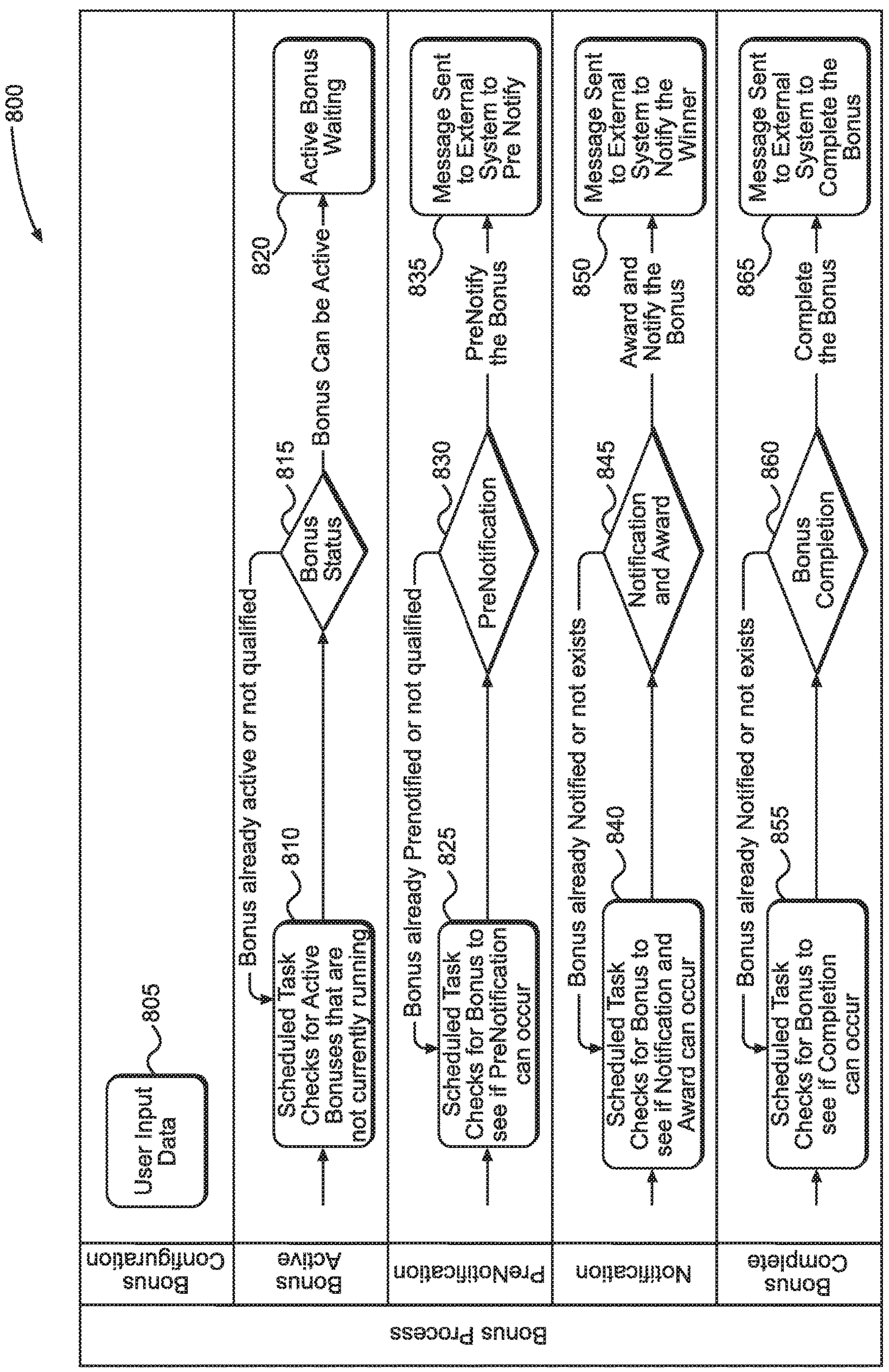
FIG. 8 is a bonus process state diagram for a marketing bonus system.

FIG. 8 is a bonus process state diagram 800. As can be seen, the bonus is created from a timed job that checks the configurations as shown in FIG. 4 to see whether a new bonus is to be created. If appropriate a new bonus will be configured with specified values and created by the RNG as part of the new bonus event. Once a bonus is configured and created at 805, the bonus becomes active and it is determined whether the active bonus is currently running at step 810. Bonus status is continually checked at step 815, and as long as the bonus is either not yet qualified or not running, the bonus is in an active bonus waiting state as indicated at step 820. In addition to the timing and eligibility for a particular bonus, the bonus may also be configured with distinctive lighting on lighting system 355, sounds on speakers 360 and visual images on displays 350. For example, the bonus may be a thunderstorm theme with appropriate thunder clap sounds and rain, as well as visual effects of a darkening sky using lighting and screen displays. Alternatively, the bonus may be a Hawaiian tropical theme with soothing music and rainbows.

Once a bonus goes active, the prenotification process is triggered at step 825. If the bonus becomes active and prenotification has not yet been provided, prenotification is queued at step 830 and a message is sent to the EBS to pre-notify at step 835. Once prenotification is complete, eligible EGMs are in play and players continue to play. During the bonus cycle, a continuous status check is made to ensure that notification of a prize to be awarded can occur at step 840. Once RNG 335 on EBS 200 delivers a winning number, notification of the award occurs at step 845, and a message is transmitted to EGM 100 and to the external display system at step 850 to notify the winner. The awarding of the bonus is accompanied by the sounds and visuals for the particular bonus theme both on EGM 100 and as provided by effects system 340 controlling speakers 360, lighting 355 and external displays 350. Finally, after the player is notified of the win, the scheduled task checks the status of the bonus to see if the bonus cycle can be completed at step 855. If so, the bonus is completed at step 860 and a message is transmitted to the external system at step 865 confirming that the bonus is complete. Effects system 340 returns to normal lighting and visuals on the external displays as well as sounds from the speakers.

Figure 9:
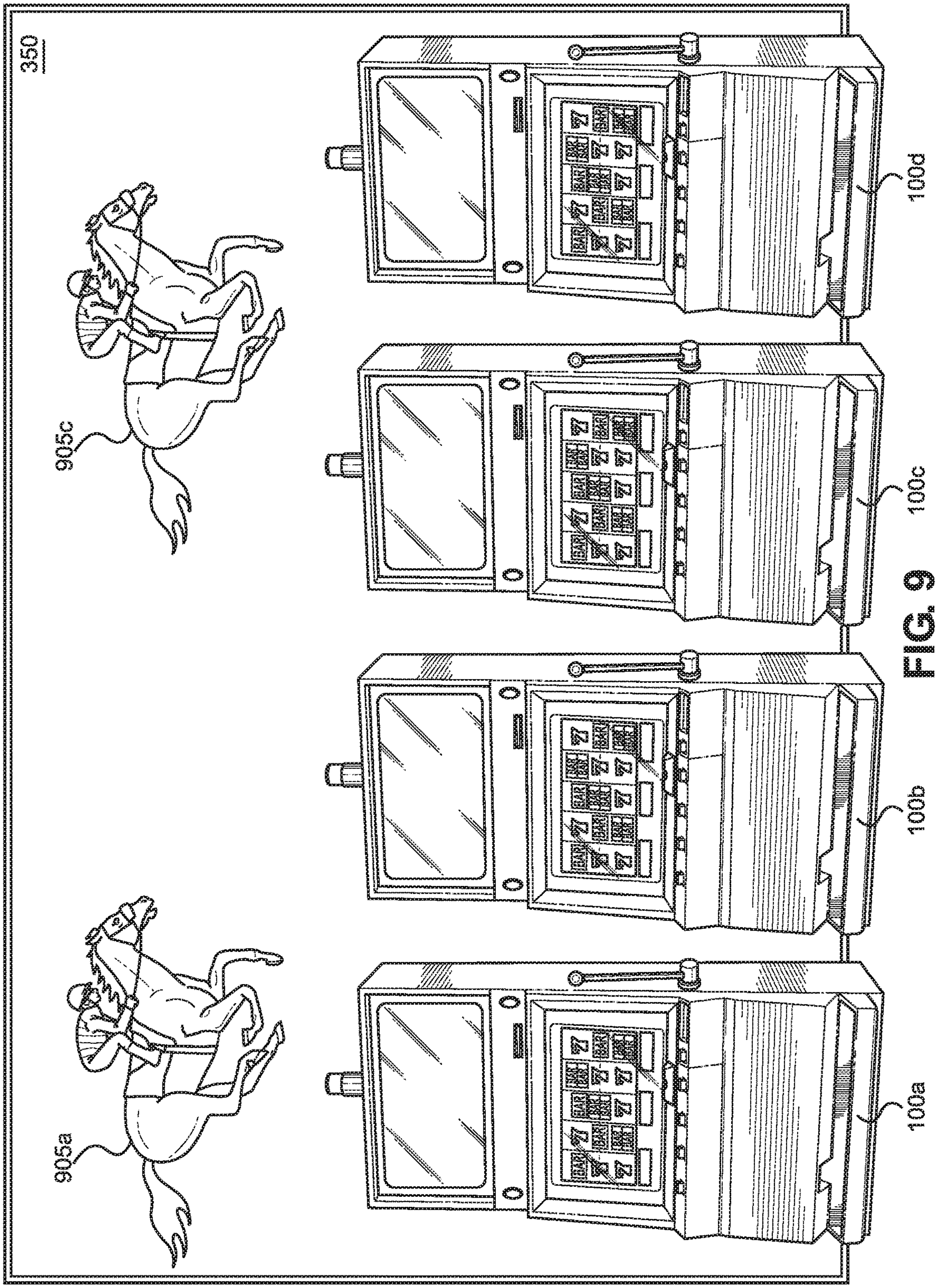
FIG. 9 is a display over an electronic gaming machine showing participation in a bonus event on a marketing bonus system.

FIG. 9 is an example of a display 350 which is typically a component of effects system 340. Display 350 is positioned over or behind a group of EGMs 100*a-d* although it can be located anywhere in the establishment. In FIG. 9, display 350 is being used to show visual images representing player participation in a bonus event using a live data feed or a recorded data feed. The visual representation of play may be accompanied by lighting and sound effects on effects system 340 while the bonus game is conducted on EGMs 100*a-d*. The visual aspects of the live or recorded data feed on display 350 provide an exciting representation that gives players the sense that they have a stake in the event, whether it is a horse race as shown, a baseball game, another sporting match or any other representative competition between different teams, individuals or other competitors where one or more participants wins. As the players continue to play at their respective EGM, they are able to see the bonus event competition unfold until the outcome of the event is determined and the winner of the bonus event is revealed. In this case, the bonus is shown in the form of a horse race where horses 905*a*, 905*c* are shown above EGMs 100*a*, 100*c* respectively that are eligible to participate in the bonus event. Winners are selected and there can be multiple winners per event and multiple events.

While the invention has been described with respect to the figures, it will be appreciated that many modifications and changes may be made by those skilled in the art without departing from the spirit of the invention. For example, EBS 200 may be connected to EGMs across multiple gaming sites. Any variation and derivation from the above description and drawings are included in the scope of the present invention as defined by the claims.

What is claimed is:

1. A system for awarding a bonus award to a player of an electronic gaming machine ("EGM") participating in the active play of the EGM indicated by the use of an identifier, comprising:
- a network;
- a bonusing system external to but connected to the network, comprising:
  - a controller for controlling system operations in the bonusing system including determining prize selections and including receiving input from a plurality of electronic gaming machines ("EGMs") connected to the network;
  - a memory for storing software accessible by the controller that provides instructions for operating the bonusing system including a random number generator ("RNG") for generating random numbers that determine the outcome of a bonus game and that correspond to a predetermined set of game outcomes including winning outcomes for which prizes are awarded;
  - a bonus system display for displaying information related to bonusing system operations including displaying, during a pre-notification period, a pre-notification of an upcoming prize to be awarded to at least one player wherein the pre-notification is provided in advance of the prize being determined and awarded, wherein the prize is awarded once the pre-notification period expires;
  - a first database configured to manage prize data for winning outcomes; and
  - wherein a winning player is awarded the prize at a winning EGM determined by the controller at random, and not based on an outcome of game activity on the winning EGM, and further wherein the bonusing system transmits a signal to the winning EGM indicating the prize to be awarded.

2. The system of claim 1 wherein the predetermined time is one of the group comprising: (a) a preset time; or (b) a preset time range.

3. The system of claim 2 wherein the predetermined time when the prize is awarded is determined at random.

4. The system of claim 2 wherein the preset time range has a start time and an end time between which the prize is awarded, wherein an actual time selected for the prize to be awarded is selected at random.

5. The system of claim 1 wherein a prize award notice is transmitted to a winner through an interface on the winning EGM.

6. The system of claim 1 wherein a value of the prize is configurable based on operator defined values.

7. The system of claim 1 wherein multiple levels of prizes are available to be won by players at a particular time.

8. The system of claim 1 wherein timing to display a win of the prize via the interface is configurable.

9. The system of claim 1 wherein a minimum number of players must be eligible before the prize is won.

10. The system of claim 1 wherein the frequency of awarding prizes is configurable based on operator defined values.

11. The system of claim 1 wherein a probability that an eligible player will win the prize is based on one or more factors from the group comprising: (a) player rank; (b) player's date of birth; (c) player's historical play level; (d) player affinity group affiliations; (e) location of EGM within which a player card is active; (f) wager denomination by player; (g) manufacturer of EGM within which a player card is active; (h) unique identifier of EGM within which a player card is active; (i) game type installed on EGM within which a player card is active; (j) type of EGM within which a player card is active; (k) level of play on EGM within which a player card is active; (l) level of win on EGM within which a player card is active.

12. A method of awarding a bonus to a player of an electronic gaming machine ("EGM") participating in active play of the EGM among a plurality of EGMs, wherein the EGMs are in communication with an external bonusing system on a network, wherein the bonusing system is external to the EGMs, the method comprising the steps of:

receiving data of a particular EGM data indicating a player is actively playing the particular EGM;

determining an identifier of the EGM by the external bonusing system, the identifier indicating that the player is actively playing the particular EGM;

providing a first database accessible by the bonusing system and configured to manage prize data for prizes to be awarded to players of the EGMs;

determining using a bonusing system controller either:

(a) a particular time at which, or (b) a particular time range within which, a prize will be awarded, determining a pre-notification period that comprises a period of time, prior to the particular time and the particular time range, during which a notification that the bonus will be awarded at the expiration of the pre-notification period is displayed to the player;

selecting, at the expiration of the pre-notification period, a particular prize to be awarded from among the prizes in the first database at the time or within the time range using the bonusing system controller;

providing a pre-notification signal to a display on the network in communication with the bonusing system in advance of the determination and award of a prize by the bonusing system;

indicating on the display, for a duration of the pre-notification period, a notification that a prize will be determined and awarded to at least one player at the time or within the time range; and awarding at least one winning player the particular prize at a winning EGM, wherein the winning EGM is determined by the bonusing system controller at random, and not based on an outcome of game activity on the winning EGM.

13. The method of claim 12 wherein the time or time range when the prize is awarded is determined at random.

14. The method of claim 12 wherein the time range has a start time and an end time between which the prize is awarded, wherein an actual time selected for the prize to be awarded is selected at random.

15. The method of claim 12 wherein a prize notice is transmitted to a winner through an interface on the winning EGM.

16. The method of claim 12 wherein a value of the prize is configurable based on operator defined values.

17. The method of claim 12 wherein multiple levels of prizes are available to be won by players at a particular time.

18. The method of claim 12 wherein timing to display a win of the prize via the interface is configurable.

19. The method of claim 12 wherein a minimum number of players must be eligible before the prize is won.

20. The method of claim 12 wherein the frequency of awarding prizes is configurable based on operator defined values.

21. The method of claim 12 wherein a probability that an eligible player will win the prize is based on one or more factors from the group comprising: (a) player rank; (b) player's date of birth; (c) player's historical play level; (d) player affinity group affiliations; (e) location of EGM within which a player card is active; (f) wager denomination by player; (g) manufacturer of EGM within which a player card is active; (h) unique identifier of EGM within which a player card is active; (i) game type installed on EGM within which a player card is active; (j) type of EGM within which a player card is active; (k) level of play on EGM within which a player card is active; (l) level of win on EGM within which a player card is active.

* * * * *